United States Patent [19]

Thakore et al.

[11] Patent Number: 4,954,145

[45] Date of Patent: Sep. 4, 1990

[54] FILLED MEMBRANES FOR SEPARATION OF POLAR FROM NON-POLAR GASES

[75] Inventors: Yatin B. Thakore, East Brunswick; Vladimir Stoy, Princeton, both of N.J.

[73] Assignee: Kingston Technologies, Dayton, N.J.

[21] Appl. No.: 155,986

[22] Filed: Feb. 16, 1988

Related U.S. Application Data

[63] Continuation-in-part of Ser. No. 926,447, Nov. 3, 1986, abandoned.

[51] Int. Cl.$^5$ .................... B01D 53/22; B01D 61/38
[52] U.S. Cl. ............................ 55/16; 55/68; 55/158; 423/228
[58] Field of Search .................... 55/16, 68, 158; 423/228, 229

[56] References Cited

U.S. PATENT DOCUMENTS

| | | | |
|---|---|---|---|
| 2,983,767 | 5/1961 | Fleck et al. ........................ | 55/16 X |
| 3,335,545 | 8/1967 | Robb et al. ........................ | 55/16 |
| 3,396,510 | 8/1968 | Ward, III et al. ................. | 55/16 |
| 3,410,794 | 11/1968 | Li ................................... | 55/16 X |
| 3,447,286 | 6/1969 | Dounoucos ......................... | 55/16 |
| 3,503,186 | 3/1970 | Ward, III ........................... | 55/16 |
| 3,625,734 | 12/1971 | Ward, III ........................... | 55/16 X |
| 3,653,180 | 4/1972 | Juliano et al. .................... | 55/16 |
| 3,770,842 | 11/1973 | Steigelmann et al. ............. | 55/16 X |
| 3,819,806 | 6/1974 | Ward, III et al. .................. | 55/16 X |
| 3,823,529 | 7/1974 | Hughes et al. ..................... | 55/16 |
| 3,856,921 | 12/1974 | Shrier et al. ...................... | 423/228 |
| 3,864,418 | 2/1975 | Hughes et al. ..................... | 55/16 X |
| 3,911,080 | 10/1975 | Mehl et al. ........................ | 55/16 X |
| 3,957,504 | 5/1976 | Ho et al. ........................... | 55/16 X |
| 4,115,514 | 9/1978 | Ward ................................. | 55/16 X |
| 4,117,079 | 9/1978 | Bellows ............................. | 55/16 X |
| 4,119,408 | 10/1978 | Matson .............................. | 55/16 X |
| 4,174,374 | 11/1979 | Matson .............................. | 55/16 X |
| 4,217,238 | 8/1980 | Sartori et al. .................... | 423/228 X |
| 4,238,206 | 12/1980 | Hong ................................. | 55/68 X |
| 4,240,922 | 12/1980 | Sartori et al. .................... | 423/228 X |
| 4,330,305 | 5/1982 | Kuessmer et al. ................. | 55/68 X |
| 4,542,010 | 9/1985 | Roman et al. ..................... | 55/16 X |
| 4,556,546 | 12/1985 | Burgoyne, Jr. et al. .......... | 55/68 X |
| 4,606,740 | 8/1986 | Kulprathipanja .................. | 55/68 X |
| 4,608,060 | 8/1986 | Kulprathipanja et al. ........ | 55/16 |
| 4,617,029 | 10/1986 | Pez et al. .......................... | 55/16 |

FOREIGN PATENT DOCUMENTS

| | | | |
|---|---|---|---|
| 186182 | 7/1986 | European Pat. Off. ............ | 55/158 |
| 150508 | 8/1984 | Japan ................................. | 55/158 |
| 137416 | 7/1985 | Japan ................................. | 55/158 |
| 90722 | 5/1986 | Japan ................................. | 55/16 |

OTHER PUBLICATIONS

Ward, Recent Developments in Separation, Sci., vol. 1, CRC Press, 1972, pp. 153-161.

Bloch et al., Recent Development in Ion Selective Membrane, etc., P. Mears Ed; Elsevier, N.Y. (1976), pp. 477-498.

*Primary Examiner*—Robert Spitzer
*Attorney, Agent, or Firm*—Mathews, Woodbridge & Collins

[57] ABSTRACT

Gas permeable, filled pore membranes in which the pores are filled with a substantially non-aqueous mixture of a polyhydroxy solvent and a gas carrier. A typical example is a membrane filled with glycerol and triethanolamine.

21 Claims, No Drawings

FILLED MEMBRANES FOR SEPARATION OF POLAR FROM NON-POLAR GASES

CROSS REFERENCE

This is a continuation-in-part of Ser. No. 926,447 filed Nov. 3, 1986 now abandoned.

BACKGROUND OF THE INVENTION

This invention relates to a gas permeable, filled pore membrane and to the separation of polar gases such as carbon dioxide and non-polar gases, such as hydrocarbons, using such membranes.

Various supported or immobilized liquid membranes are described in U.S. Pat. Nos. 3,335,545, 3,396,510, 3,819,806, 4,117,079, 4,115,514 and 3,447,286. All of these operate chemically through ionic acid-base equilibriums in which water is an essential component of the net reaction. In the case of U.S. Pat. No. 4,117,079, a hydrophilic material which is impregnated with an aqueous carbon dioxide hydration catalyst is sandwiched between two layers of a hydrophobic material. In U.S. Pat. No. 3,447,286 a silicone envelope is provided to avoid loss of water.

DETAILED DESCRIPTION

The present invention pertains to a gas permeable, filled pore membrane. The pores of the membrane have a size of from 5 angstroms to about 10 microns and are filled with a substantially non-aqueous composition which contains an amine, a (hydroxyalkyl)amine or an alkali metal salt of a weak acid.

The membranes can be isotropic, with a substantially uniform pore distribution, or asymmetric. Typical isotropic membrane materials include cellulose esters, polyvinylidine fluoride, polytetrafluoroethylene, polypropylene, nylon, and polysulfone. Asymmetric materials include polysulfone, polyacrylonitrile, and cellulose esters.

The solvents which are utilized include polyhydroxy alkanes having 2 to 6 carbon atoms in the chain, preferably 2 to 3 carbon atoms, and bearing at least two hydroxyl groups. Especially suitable are glycerol, ethylene glycol, and propylene glycols. The solvent should be liquifiable without degradation at the operating temperatures and thus most sugars would not meet the requirements of stability and liquifiability at operating temperatures (sugars, however, can be used together with the solvents mentioned above as secondary solvents). There also can be used as solvents alpha-omega dihydroxypoly(oxyalkylenes) in which the alkylene chain contains from 2 to 4 carbon atoms. Especially suitable are polyethylene glycol and polypropylene glycol. The chain length can be such as to produce a molecular weight of approximately 600 (between 1 and 8 oxyalkylene units) but molecular weights of up to about 200 are preferred.

The carrier is one or more organic or inorganic compounds which are capable of entering into a reversible equilibrium reaction with the target polar gas to be removed from the gas stream. The nature of these compounds will depend upon the nature of the gas to be removed; e.g., carbon dioxide, sulfur dioxide, dihydrogen sulfide, oxygen, etc. Thus amines and (hydroxy lower alkyl)amines can be utilized for the separation of carbon dioxide, sulfur dioxide, and dihydrogen sulfide from other relatively less polar gases. With carbon dioxide, an alkali metal salt of a weak acid can be employed as the carrier and for sulfur dioxide, an alkali sulfite can serve as the carrier. Similarly, when extracting oxygen an iron (ii) phthalocyanine tetrasulfonic acid or water soluble sulfonated cobalt (iii) bis-salicylaldehyde, amines can be employed.

The carriers for carbon dioxide can be an alkali metal salt of a weak acid, preferably an acid having a pK at 25° C. of greater than 2. The alkali metals include all alkali metals, preferably sodium or potassium. Among the suitable inorganic and organic salts can be mentioned carbonates, bisulfites, phosphates, arsenites, borates, phenolates, citrates, acetates, and benzoates. A salt of an amino acid, in particular, hydroxyaminoacids also can be used. Similarly, amines and (hydroxy lower alkyl)amines can be used. These may be alkyl, alkaryl, aryl or aralkyl amines. Typical (hydroxy lower alkyl)amines include mono-, di- and triethanolamines, tri- and diisopropanolamine, methylethanolamine and beta,-beta'-hydroxy-aminoethyl ether.

The boiling point of the carrier should exceed 150° C., and preferably about 300° C. The carrier should have a vapor pressure at 20° C. under 1 mm Hg and high solubility, preferably total miscibility in water.

The concentration of the carrier in the solvent may range from about 5% (w/w) up to the saturation concentration. Preferably the range is from about 5 to 80% and most preferably from 10 to 50%. The carrier can be solid or liquid, either at operating temperatures or ambient temperature, provided the carrier/solvent composition is liquid at operating temperatures. The carrier also can crystallize at ambient temperatures, although if there is substantial crystallization at operating temperatures, the efficiency of the membrane may be reduced.

Generally, the membrane is filled by immersing it in a mixture of the solvent and carrier and allowed to equilibrate. When the mixture of solvent and carrier is highly viscous, it can be diluted with water. When the membrane initially is dry, it is desirable to place the membrane and the solvent/carrier solution under modestly reduced pressure; e.g., between 1 and 10 millimeters of mercury, for from about 10 to about 15 minutes, so as to reduce the air in the pores of the membrane. If the membrane matrix is not easily wetted by the carrier/solvent filler, either wetting agents can be added or the pores initially can be filled with a suitable liquid which both wets the membrane and is miscible with the carrier/solvent composition, and the carrier/solvent composition subsequently is exchanged with the liquid in the membrane pores by diffusional exchange or by application of pressure. Alcohols and acetone are particularly convenient for initial wetting of many hydrophobic membranes.

After the membrane has been treated in accordance with the foregoing procedures, it is dried. Drying can be performed in an atmospheric air stream at ambient temperatures over a period of 12 to 72 hours. This removes from the membrane any water as may be used as a diluent to reduce the viscosity of the carrier, leaving only the carrier solvent composition in the pores. Alternatively, the membranes can be dried under a heat lamp at about 40°–50° C. for about 1 hour.

When added stabilization is required, as when the membrane will be used at high temperatures and pressures, the carrier and solvent filler can be lightly cross-linked with cross-linking agents such as, for example, di- or tri-isocyanates, expoxies, etc.

The membrane can be shaped as a flat sheet, a tubular sheet, a flat sheet wound as a spiral, or in the form of hollow fibers.

In use, a stream of gas or gases is passed across one side of the membrane (feed side). The operating pressures and temperatures are selected depending upon the nature of the input gases and their initial environment. In contrast to conventional liquid membranes used for this purpose, it is not necessary to maintain a humid atmosphere in the vicinity of the membrane. It is preferred, however, to operate under conditions where the pressure on the feed side is higher than the pressure on the wash (or permeate) side which would normally run at or below atmospheric pressure. The amount of the pressure differential normally will be from about 10 p.s.i. to about 1500 p.s.i., depending upon the pressure of available feed and application. The membrane allows the polar gases to move more readily to the permeate side. The gases exiting from the feed side are enriched in non-polar gases, whereas gases exiting from permeate side are enriched in polar gases.

In contrast to known technologies for carrier-mediated transport of polar acidic gases, the present membranes facilitate transport in the absence of water. Thus it is not necessary to provide hydrophobic outer layers nor to control humidity, either of the membrane or the feed gases.

The following examples will serve to further typify the nature of the present invention.

EXAMPLE I

General Preparation and Test Procedures

A. Preparation of Substrate Membrane

Polyacrylonitrile (DuPont Type A, 150,000 m.w.) was dissolved in dimethylformamide to give 21% by weight solution which was filtered hot at 80° C. through a S.S. 5 micron filter. The filtered solution was cast hot at 80° C. on glass plates with a doctor blade and then immediately coagulated in deionized water at 20° C. The resultant membranes were asymmetric ultrafiltration type with an ultra-thin skin layer and porous spongy substructure. The membranes had a molecular weight cut-off of about 10,000 daltons, indicating pore diameter in the skin region of the order of 15 to 20A°. The membrane thickness was varied between about 5 mils to 15 mils (125–375 microns).

The wet membranes were punched into discs 45 mm in diameter with a punch. The pores then were filled with the indicated composition (see below). In those instances in which the carrier and solvent were too viscous to insure complete penetration, water was added to the carrier solvent combination and following equilibration, the water was removed by blotting the discs dry between paper towels, clamping the membrane in a cell holder, and warming the membrane to approximately 40° to 50° C. with a heat lamp for one hour.

B. Test Procedure

The gas mixture was prepared by blending methane and carbon dioxide from 10 to 25% by volume in the feed gas and passed over the membrane under pressure of from 10 to 100 psig. The flow rate of the feed gas was maintained at least at 5 cc/min. On the bottom side of the membrane, a helium purge was maintained at just over atmospheric pressure (about 1 psig) at a flow rate of helium of between 0.2 and 20 cc/min, depending upon the membrane's permeation rate.

After steady state was established, subsequent to adjustments of pressure (at least one hour), the permeate samples were withdrawn with gas-tight syringe from the permeate outlet line (typically 2–5 ml. samples were withdrawn) and analyzed on Gow-Mac Model 550P gas chromatograph with thermal conductivity detector (Gow-Mac Instruments, Bridgewater, N.J.). The column used for detection was Sphereocarb 100/120 mesh—3 ft. × ⅛inch O.D, S.S., (Foxboro Company, North Haven, Conn.). Feed mixture composition also was analyzed in similar fashion. Typical volumes of feed gas withdrawn were from 0.2–1 ml.

The gas chromatograph analysis conditions were as follows: Injection temp.=100° C.; detector temp.=116° C.; column temperature 90° C. (isothermal mode), gas chromatograph attenuation at 4, helium flow at 50 cc./min). The gas chromatograph was equipped with Spectra-Physics 4270 recorder-integrator (Spectra Physics, San Jose, Calif.) for integrating peak areas and composition.

The effective membrane area in the cell was 8.04 cm². Permeability was calculated as $$P_{gas} = \frac{cm^3}{sec} \times \frac{d}{cm^2 \cdot cm_{Hg}}$$

where d is the membrane thickness in cm. The separation factors were calculated as the ratio of composition in the permeate and feed, e.g.

$$\alpha_{G1/G2} = \frac{([G_1]/[G_2])_{permeate}}{([G_1]/[G_2])_{feed}}$$

where $\alpha$ is the separation factor and $[G_1]$ and $[G_2]$ are mole fractions of gas 1 and gas 2, respectively. The separation factor also can be calculated from the ratios of permeabilities; i.e., $P_{gas1}:P_{gas2}$.

EXAMPLE II

Composition A.

Wet, water-filled membrane discs, prepared as described in Example IA, were placed in a large excess of 50:50 glycerol:water mixture and allowed to equilibrate with occasional stirring for at least two days. Glycerol was ACS grade from Fisher Scientific, Springfield, N.J. After water/glycerol solution exchanged with the water in the pores of the membranes, the membrane discs were removed from the solution, blotted dry between paper towels, and the water was allowed to evaporate. For this, the membrane was clamped in a cell holder and warmed at about 40°–50° C. with a heat lamp for approximately 1 hour. This membrane had average thickness of 5.57 mils (after water removal, effective thickness was half of that; i.e., 2.78 mils or 70.74 microns).

EXAMPLE III

Composition B.

The procedure of Example II was used but the substrate membrane was placed directly in triethanolamine (Aldrich, 95%, St. Louis, Mo.). The membrane was blotted dry after removal from triethanolamine. The average thickness of this membrane was 8.8 mils (224 micron).

EXAMPLE IV

Composition C-1 —Procedure A

The procedure of Example II was followed but in place of 50:50 glycerol:water, the wet membrane was exchanged in 50 parts glycerol, 50 parts water, and 10 parts by weight of triethanolamine.

After two days of equilibration, the membrane was placed in 100 parts glycerol containing 20 parts of triethanolamine and equilibrated for two more days.

Average thickness of the membrane was 5.9 mils=150.2 microns.

Procedure B

The procedure of Example II was followed but in place of 50:50 glycerol:water, the wet membrane was exchanged in 50 parts glycerol, 50 parts water, and 10 parts by weight triethanolamine over two days. The membranes were then dried as described in Example II. The membrane thus was effectively left with 20% by weight of triethanolamine in glycerol.

The thickness of the membrane was 7.8 mils=198.5 microns and effective thickness after water removed was half of that; i.e., 3.9 mils=99.3 microns.

EXAMPLE V

Composition C-2

The procedure of Example II was followed but in place of 50:50 glycerol:water, the membrane discs were placed in 25 parts glycerol, 75 parts deionized water, and 20 parts triethanolamine (all by weight), allowed to equilibrate for two days and dried as before. (This effectively gave a concentration of 80% by weight of triethanolamine in glycerol). The membrane thickness was 15 mils and the effective thickness (due to water evaporation) was 3.75 mils (95.4 microns).

EXAMPLE VI

Composition C-3

The procedure of Example II was followed but in place of 50:50 glycerol:water, there was utilized 50 parts of glycerol, 50 parts of water, 10 parts triethanolamine, and 17.5 parts potassium carbonate (all by weight).

Following equilibration for two days, the water was removed. When the membrane was not dried completely (water still present to some extent), a much higher selectivity was found (2240). As membrane dried in cell, this selectivity dropped to 820. The thickness of membrane was 8.7 mils and the effective thickness after drying was 4.35 mils (110.8 microns). After drying, this membrane effectively had 20% triethanolamine and 35% potassium carbonate as carrier in glycerol.

EXAMPLE VII

Composition C-4

The procedure of Example VI was followed but 1% by weight of sucrose was also added. (After drying, the membrane effectively had 20 parts by weight of triethanolamine, 35 parts by weight of potassium carbonate and 2 parts by weight of sucrose in solvent glycerol). The membrane thickness was 12.7 mils and the effective thickness (after drying) was 6.35 mils (161.6 microns).

The data in Table I shows the effectiveness of the carriers in improving the separation factors. Whereas glycerol (Composition A) and triethanolamine (Composition B) have modest separation factors, the combination of two with glycerol as solvent and triethanolamine as carrier (Compositions C-1 and C-2) improves the separation factors several-fold. Further addition of potassium carbonate (Compositions C-3 and C-4) increases the separation factor even more.

TABLE I

| Composition | Input Pressure p.s.i.g. | Partial Pressure $CO_2$ | Permeability | Separation Factor |
| --- | --- | --- | --- | --- |
| A | 10 | 1.0 | $1.25 \times 10^{-8}$ | 60 |
|   | 40 | 4.0 | $5.5 \times 10^{-9}$ | 46 |
| B | 10 | 2.5 | $9 \times 10^{-9}$ | 50 |
|   | 20 | 5.0 | $5 \times 10^{-9}$ | 45 |
|   | 50 | 12.5 | $3 \times 10^{-9}$ | 50 |
|   | 70 | 17.5 | $2 \times 10^{-9}$ | 30 |
| C-1 | $10^3$ | 1.0 | $5 \times 10^{-8}$ | 360 |
|   | $10^2$ | 2.5 | $9 \times 10^{-9}$ | Note 1 |
|   | $40^2$ | 10.0 | $6 \times 10^{-9}$ | 180 |
|   | $40^3$ | 4.0 | $2.5 \times 10^{-8}$ | 188 |
|   | $75^2$ | 17.5 | $6 \times 10^{-9}$ | 155 |
| C-2 | 10 | 2.5 | $5 \times 10^{-8}$ | 90 |
|   | 20 | 5.0 | $2.0 \times 10^{-8}$ | 250 |
|   | 40 | 10.0 | $1.5 \times 10^{-8}$ | 200 |
|   | 60 | 15.0 | $1.1 \times 10^{-8}$ | 200 |
|   | 80 | 20.0 | $9 \times 10^{-9}$ | 170 |
|   | 100 | 25.0 | $7 \times 10^{-9}$ | 150 |
| C-3 | 11 | 1.0 | $7.5 \times 10^{-8}$ | $2240^4$ |
|   | 11 | 1.0 | $3.8 \times 10^{-8}$ | 870 |
|   | 40 | 4.0 | $1.2 \times 10^{-8}$ | 280 |
|   | 60 | 6.0 | $8 \times 10^{-9}$ | >590 |
| C-4 | 11 | 1.0 | $9 \times 10^{-8}$ | 740 |
|   | 40 | 4.0 | $2.4 \times 10^{-8}$ | 200 |
|   | 60 | 6.0 | $1.6 \times 10^{-8}$ | 445 |

Note 1 Insufficient resolution of methane peak to provide baseline.
Note 2 Procedure A.
Note 3 Procedure B.
Note 4 Before complete drying.

EXAMPLE VIII

Composition D

The procedure of Example II was followed but in place of 50:50 glycerol:water there was utilized 50:50 water: polyethylene glycol (mol wt. 200; Fluka, Ronkonkoma, N. Y.). The membrane thickness was 16.9 mils and the effective thickness after water removal was 8.45 mils (215 microns).

EXAMPLE IX

Composition E-1

The procedure of Example II was followed but in place of 50:50 glycerol:water, there was utilized 50 parts polyethylene glycol 200, 50 parts of water, and 12 parts triethanolamine. The membrane thickness was 16.35 mils and the effective thickness after drying was 8.18 mils (208.2 microns).

EXAMPLE X

Composition E-2

The procedure of Example IX was followed employing, however, polyethylene glycol 600 in place of polyethyl glycol and increasing the triethanolamine to 20 parts by weight. The membrane thickness was 12.83 mils and the effective thickness after drying was 6.42 mils (163.4 microns).

EXAMPLE XI

Composition E-3

The procedure of Example X was followed but 35 parts of potassium carbonate and two parts of sucrose also were added. The membrane thickness was 5.62 mils. Effective thickness after drying was 2.81 mils (71.5 microns).

EXAMPLE XII

Composition F

The procedure of Example II was followed utilizing, however, 10 parts of glycerol, 90 parts of water and 2.5 parts of polyethyleneimine (m.w. 20,000) all by weight. The thickness of the membrane was 16 mils. The effective thickness after drying was 1.6 mils (40.72 microns).

EXAMPLE XIII

Composition G—Crosslinked Film Membrane

A membrane was prepared in accordance with the procedure of Example IV. The membrane was then immersed in a solution of toluene diisocyanate in toluene (5% w/w) for 15 minutes in order to cross link the glycerol and the triethanolamine. The substrate membrane was then removed from the cross-linking solution, blotted, and washed in deionized water for 15 minutes to remove any uncrosslinked solvent or carrier and then dried in the manner of Example II. Total thickness of the membrane was 12.36 mils (314 microns).

TABLE II

| Composition | Input Pressure p.s.i.g. | Partial Pressure $CO_2$ | Permeability | Separation Factor |
|---|---|---|---|---|
| D | 10 | 1.0 | $4 \times 10^{-8}$ | 55 |
|   | 40 | 4.0 | $2 \times 10^{-8}$ | 30 |
|   | 60 | 6.0 | $2 \times 10^{-8}$ | 25 |
| E-1 | 10 | 1.0 | $5 \times 10^{-8}$ | 100 |
|   | 40 | 4.0 | $2.4 \times 10^{-8}$ | 150 |
| E-2 | 10 | 2.5 | $8 \times 10^{-9}$ | 30 |
|   | 40 | 6.0 | $6 \times 10^{-9}$ | 50 |
| E-3 | 10 | 2.5 | $4 \times 10^{-9}$ | 33 |
|   | 20 | 5.0 | $2.5 \times 10^{-9}$ | 35 |
|   | 40 | 10.0 | $2.3 \times 10^{-9}$ | 35 |
| F | 10 | 1.0 | $1.8 \times 10^{-8}$ | 67.5 |
|   | 40 | 4.0 | $7 \times 10^{-9}$ | 45 |
|   | 70 | 7.5 | $5.9 \times 10^{-9}$ | 45 |
| G | 10 | 1.0 | $2 \times 10^{-7}$* | 80 |

*Not corrected for effective thickness.

What is claimed is:

1. The process which comprises passing a mixture of gases across a first side of a gas permeable, filled pore membrane at a pressure higher than that which obtains on the second side of said membrane, said membrane comprising:
   (a) a porous membrane, the pores of which have a size of from about 5 angstroms to about 10 microns, and
   (b) a substantially non-aqueous composition filling said pores, said composition comprising:
      (i) a polar organic solvent of low volatility and having a boiling point of at least about 150° C., said solvent consisting of at least one member selected from the group consisting of an alkane polyglycol of 2 to 6 carbon atoms and a poly(alkyleneoxy) of an alkane glycol of 2 to 4 carbon atoms having a molecular weight up to 600; and
      (ii) at least one gas carrier component selected from the group consisting of alkali metal salts of weak acids having a pK at 25° C. exceeding 2.0, amines, and (hydroxy lower alkyl)amines, said amines and (hydroxy lower alkyl)amines having low volatility and a boiling point of at least about 150° C.,
whereby gases in said mixture which react with said gas carrier component diffuse preferentially to said second side of said membrane.

2. A gas permeable, filled pore membrane comprising:
   (a) a porous membrane, the pores of which have a size of from about 5 angstroms to about 10 microns, and
   (b) a substantially non-aqueous composition filling said pores, said composition comprising:
      (i) a polar organic solvent of low volatility having a boiling point of from at least about 150° C., said solvent consisting of at least one member selected from the group consisting of an alkane polyglycol of 2 to 6 carbon atoms and a poly(alkyleneoxy) of an alkane glycol of 2 to 4 carbon atoms and having a molecular weight up to 600; and
      (ii) at least one gas carrier component selected from the group consisting of alkali metal salts of weak acids having a pK at 25° C. exceeding 2.0, amines, and (hydroxy lower alkyl)amines, said amines and (hydroxy lower alkyl)amines having low volatility and a boiling point of at least about 150° C.

3. A gas permeable, filled pore membrane according to claim 2 wherein the boiling point of the solvent exceeds about 250° C.

4. A gas permeable, filled pore membrane according to claim 2 wherein the boiling point of the amines and (hydroxy lower alkyl)amines is at least about 300° C.

5. A gas permeable, filled pore membrane according to claim 2 wherein the gas carrier compound includes a hydroxylamine or a carboxylic acid alkali metal salt.

6. A gas permeable, filled pore membrane according to claim 2 wherein the gas carrier component is the salt of a weak inorganic acid.

7. A gas permeable, filled pore membrane according to claim 6 wherein the weak inorganic acid salt is a carbonate, bisulfite, phosphite, arsenite, or borate.

8. A gas permeable, filled pore membrane according to claim 2 wherein the gas carrier component is a salt of a weak organic acid.

9. A gas permeable, filled pore membrane according to claim 8 wherein the weak organic acid salt is a phenolate, citrate, acetate, or benzoate.

10. A gas permeable, filled pore membrane according to claim 2 wherein the concentration of the gas carrier component dissolved in the solvent is from about 5 up to the saturation concentration of said gas carrier component in said solvent.

11. A gas permeable, filled pore membrane according to claim 10 wherein the pores contain the gas carrier component both dissolved in said solvent and crystallized from said solvent.

12. A gas permeable, filled pore membrane according to claim 10 wherein the concentration of the gas carrier component in said solvent is between about 10 and about 50% w/w.

13. A gas permeable, filled pore membrane according to claim 2 wherein the combined solvent and gas carrier component are liquid at about 20° C.

14. A gas permeable, filled pore membrane according to claim 2 wherein the combined solvent and gas carrier component filler is solid at about 20° C.

15. A gas permeable, filled pore membrane according to claim 2 wherein the solvent is glycerol.

16. A gas permeable, filled pore membrane according to claim 15 wherein at least one gas carrier component is triethanolamine.

17. A gas permeable, filled pore membrane according to claim 15 wherein at least one gas carrier component is potassium carbonate.

18. A gas permeable, filled pore membrane according to claim 2 wherein the solvent is polyethylene glycol having a molecular weight of about 200.

19. A gas permeable, filled pore membrane according to claim 18 wherein at least one gas carrier component is triethanolamine.

20. A gas permeable, filled pore membrane according to claim 18 wherein at least one gas carrier component is potassium carbonate.

21. A gas permeable, filled pore membrane according to claim 2 wherein the porous membrane is polyacrylonitrile.

* * * * *